United States Patent
Muto et al.

[11] 3,724,230
[45] Apr. 3, 1973

[54] TEMPERATURE CONTROL SYSTEM FOR A CAR COOLER

[75] Inventors: Katsuya Muto, Kariya; Yoshichi Kawashima, Gifu, both of Japan

[73] Assignee: Nippondenso Kabushiki Kaisha, Kariya-shi, Aichi-ken, Japan

[22] Filed: Nov. 10, 1970

[21] Appl. No.: 88,345

[30] Foreign Application Priority Data

Dec. 27, 1969  Japan..................................44/41670

[52] U.S. Cl. ......................62/133, 62/323, 123/102, 307/10 R
[51] Int. Cl. .................................................B60h 3/04
[58] Field of Search........62/133, 323, 230, 208, 209, 62/211; 236/78 R, 78 A; 165/43; 307/10 R, 254, 231; 123/102, 41, 19; 317/5; 340/11

[56] References Cited

UNITED STATES PATENTS

| | | | |
|---|---|---|---|
| 3,459,006 | 8/1969 | Hoyer | 62/209 |
| 3,570,460 | 3/1971 | Rabus | 123/102 |
| 3,581,720 | 6/1971 | Hemphill | 123/102 X |
| 3,094,850 | 6/1963 | Newton | 62/323 X |
| 3,121,314 | 2/1964 | Reinosuke Koyanagi | 62/133 |

*Primary Examiner*—William E. Wayner
*Attorney*—Cushman, Darby & Cushman

[57] ABSTRACT

A control system for a vehicle compartment cooler has been provided wherein the cooler is driven by an internal combustion engine through a magnetic clutch having a detector for providing an indication of the compartment temperature. The improvement includes, a revolution detecting means and electrical circuits associated therewith, responsive to the ignition coil for producing a train of signal pulses indicative of number of revolutions of the engine. Circuit means responsive to temperature detector and the revolution detector outputs, produces a control signal when its respective inputs are such that they respectively indicate that the engine speed and the compartment temperature have exceeded selected limits. A switching circuit is provided in order to engage the magnetic clutch for driving the cooler in response to said output control signal.

6 Claims, 3 Drawing Figures

TEMPERATURE CONTROL SYSTEM FOR A CAR COOLER

BACKGROUND OF THE INVENTION

1. Field of the Invention

The present invention relates to a temperature control system incorporated in a cooler for vehicles, particularly automobiles.

2. Description of the Prior Art

The conventional temperature control system for car cooler of this type has been constructed such that the ignition pulse voltage from an internal combustion engine mounted in a vehicle is smoothed out by means of a resistor and a capactor for switching a transistor by the smoothed output, and a rectangular wave produced at the collector of the transistor corresponding to the ignition pulse voltage is differentiated by means of a capacitor and a resistor so that the resultant positive pulse renders a transistor in the succeeding D-A converting circuit conductive. Then, the capacitor in this D-A converting circuit is directly charged from the power source through a resistor so that a switching of the transistor may be effected by an output derived from the voltage across the terminals of the capacitor. Thus, when the transistor is rendered conductive by the aforesaid positive pulse, the capacitor discharges the charge stored therein with the resultant drop in the potential across the capacitor. On the other hand, a revolution detecting circuit is provided which detects that the number of revolutions of the internal combustion engine has reached a predetermined value in that the voltage across the capacitor has dropped and the transistor has been cut off upon the engine rpm exceeding the predetermined value. A temperature detecting circuit is further provided which detects the temperature within the compartment of the vehicle by means of changes in the resistance value of a thermistor to vary the base potential of a transistor for switching the transistor. Then, in this conventional system, in order to ensure stabilized operation a series feedback is produced through a resistor for the revolution detecting circuit and at the same time both a series feedback and a parallel feed-back are produced by way of resistors for the temperature detecting circuit to provide the required hysteresis for their respective switching characteristics. Besides, and AND circuit is constituted by the output stage transistor of the revolution detecting circuit and the output stage transistor of the temperature detecting circuit so that when the logical product of this AND circuit is obtained, that is, when the number of revolutions of the engine has reached a predetermined value and further the temperature within the compartment of the vehicle has risen to a preset value, a transistor is rendered conductive to operate the compressor in the cooling system. In this case, the prerequisite that the engine speed is higher than a preset value constitutes one of the factors of the logical product because it is feared that since the compressor is driven by the engine by way of an electromagnetic clutch the compressor may become a load on the engine during a low engine speed thereby causing the engine to stop running.

However, in the conventional system as described above an ignition pulse voltage is directly smoothed out by means of a smoothing circuit comprising a resistor and a capacitor and therefore this capacitor must be large and able to withstand high voltages, while on the other hand the capacitor in the D-C converting circuit is directly charged from the power source and therefore this capacitor must be of a large size and capacity. Thus, there is a defect in that the conventional system not only tends to be very expensive, but also it tends to be very disadvantageous from the aspect of incorporating integrated circuits in the system. There is a further defect in that since the resistance values of resistors used for producing the required series feedbacks are very small such as of the order of 2 or 10 ohms, the coexistence of these low resistance value resistors together with other resistors having higher resistance values tends to make it very inconvenient for the conventional system to fabricate integrated circuits in the system. There is a still further defect in that no provision is made to prevent the breakdown of transistors due to the faults resulting from short-circuited loads.

An object of the present invention is to provide a temperature control system for a car cooler which is suited to incorporate integrated circuits therein.

Another object of the present invention is to provide a temperature control system for car cooler capable of preventing the breakdown of transistors due to the faults resulting from short-circuited loads.

A further object of the present invention is to provide an arrangement which substantially obviates one or more of the limitations and disadvantages of the described prior arrangements.

According to the present invention, the following effects can be achieved:

1 Since the ignition pulse voltage from an internal combustion engine mounted in a vehicle is divided by a voltage dividing circuit whose output voltage is in turn smoothed out by a smoothing circuit so that the output signal of this smoothing circuit conducts or cuts off a first transistor, there is a remarkable effect in that the high-tension ignition pulse voltage is reduced by the voltage dividing circuit with the result that a small and inexpensive capacitor whose capacity is less than one third of that of the corresponding capacitor of the conventional system may be used for the capacitor in the smoothing circuit of the present invention and at the same time any breakdown of the first transistor may be prevented, and this effect will prove to be considerable when integrated circuits are to be incorporated in the system.

2. Since the output signal of the first transistor is differentiated by a differentiation circuit whose output signal is in turn applied to the base of a second transistor having a capacitor connected between the base and the collector thereof and at the same time a discharging circuit is provided for this capacitor by way of an emitter follower circuit such that the output signal of this emitter follower circuit conducts or cuts off a third transistor, there is a remarkable effect in that a small and inexpensive capacitor whose capacity is less than 1/3000 of that of the conventionally used capacitor may be employed for the capacitor connected between the base and the collector of the second transistor and this is very advantageous when integrated circuits are to be incorporated in the system.

3. Since an AND circuit is provided by means of the aforesaid third transistor and a fourth transistor adapted to be conducted or cut off by the output signal of a heat sensitive element and at the same time there is provided a switching circuit for receiving the output signal from the AND circuit to operate a cooler starting means and a parallel feedback is applied by way of a resistor to the input of the third and fourth transistors, respectively, there is a remarkable effect in that resistors having resistance values of the order of several to several tens KΩ may be used as the resistors for producing such parallel feedbacks thus making it possible to make the resistance ratio for other resistors smaller and this is very advantageous for a system incorporating integrated circuit therein.

4. Since the aforesaid switching circuit comprises an input stage transistor adapted to conduct when the output signal from the AND circuit is applied thereto, output stage transistors which, upon receiving the output signal from the input stage transistor at the base thereof, are conducted or cut off to control the energization of the cooler starting means and transistors adapted to detect the collector potentials of the output stage transistors to ground the output terminal of the input stage transistor, there is a remarkable effect in that any breakdown of the output stage transistors due to a short-circuit fault in the cooler starting means which is the load may be positively prevented.

SUMMARY OF INVENTION

There has been provided a control system for a vehicle compartment cooler wherein said cooler is driven by an internal combustion engine of the vehicle through a magnetic clutch, and said cooler includes a detector for providing an indication of compartment temperature. The improvement comprises a revolution detecting means responsive to an ignition coil of the engine, for producing signals indicative of the number of revolutions of the engine. Circuitry is provided for producing a control output when its respective inputs indicate that the engine speed and compartment temperature have exceeded a selected minimum. A switching circuit is operative, when energized by said circuit means control output, engaging said magnetic clutch, thereby mechanically coupling the cooler to the engine.

For a better understanding of the present invention, together with other further objects thereof, reference is directed to the following description, taken in connection with the accompanying drawings, while its scope will be pointed out in the appended claims.

DESCRIPTION OF THE PREFERRED EMBODIMENT

Figure 1:
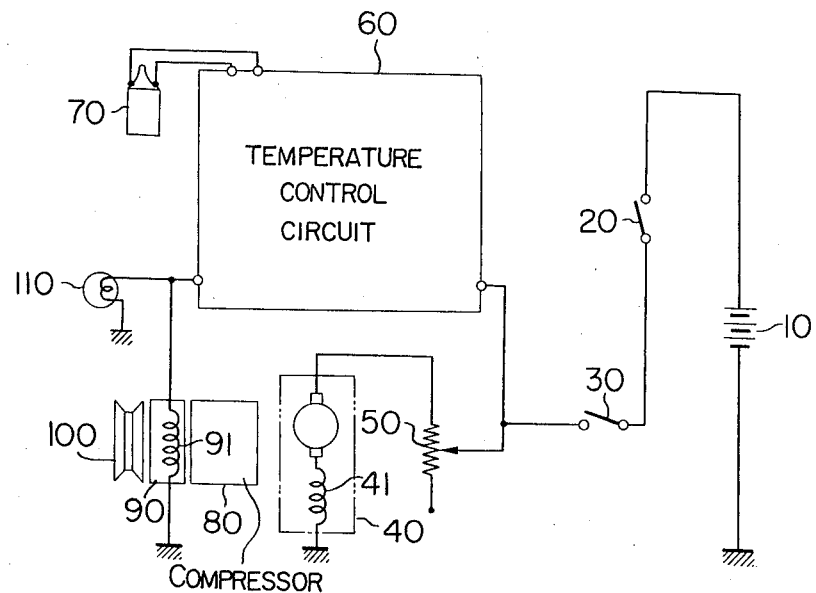
FIG. 1 is an electrical wiring diagram schematically showing the construction of an example of the car cooler incorporating the present invention.

Referring now to FIG. 1 schematically illustrating the construction of the system of the present invention, numeral 10 designates a power supply storage battery, 20 a key switch, 30 a cooler switch, 40 a blower motor with a field winding 41, 50 an air flow regulating variable resistor for varying the armature current in the blower motor 40 to change the amount of air supplied thereby. Numeral 60 designates a temperature control circuit, 70 an ignition coil mounted in an internal combustion engine (not shown) installed in the vehicle, 80 a compressor, 90 an electromagnetic clutch constituting a cooler starting means adapted to couple the driving shaft of the compressor 80 and a pulley 100 driven by the engine, 91 an electromagnetic coil of the electromagnetic clutch 90, 105 a pilot lamp adapted to be lit when the electromagnetic clutch 90 is energized to thereby give an indication to the driver that the compressor 80 is in operation.

Figure 2:
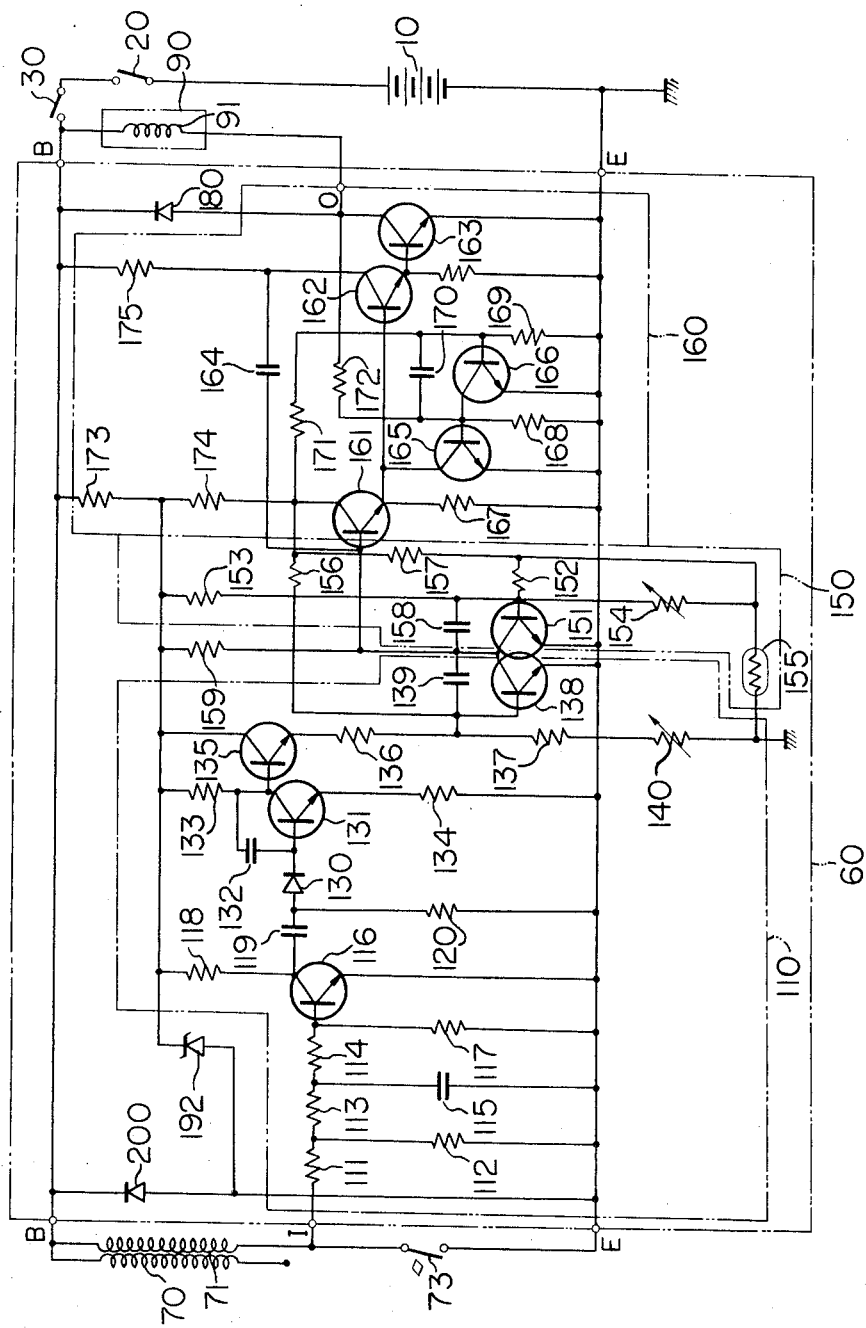
FIG. 2 is a electrical wiring diagram showing an embodiment of the temperature control system according to the present invention.

The temperature control circuit 60 will now be explained in detail with reference to FIG. 2 in which the same reference numerals as used in FIG. 1 represent the same component parts. In the figure, letter B designates a positive terminal of the storage battery 10, E a grounding terminal, I an input terminal connected to the junction point between a primary coil 71 of the ignition coil 70 and a breaker 73, 0 an output terminal. Numeral 110 designates a revolution detecting circuit, 111 and 112 resistors forming a voltage dividing circuit, 113, 114 and 115 resistors and a capacitor respectively, providing a smoothing circuit. Numeral 116 designates a first transistor, 117 and 118 resistors, 119 and 120 respectively, a resistor and a capacitor constituting a differentiation circuit, 130 a diode, 131 a second transistor, 132 a capacitor connected between the base and the collector of the transistor 131, 133 and 134 resistors, 135 a transistor constituting an emitter follower circuit, 136 and 137 emitter follower resistors. Numeral 138 designates a third transistor, 139 a capacitor, 140 a variable resistor which determines the base cut off potential of the third transistor 138.

The operation of the revolution detecting circuit 110 constructed as described above will now be explained. The ignition pulse voltage applied to the input terminal I is divided by the voltage dividing circuit comprising the resistors 111 and 112 and the thus divided ignition pulse voltage is then smoothed out by the smoothing circuit comprising the resistors 113 and 114 and the capacitor 115 so that its smoothed output conducts or cuts off the transistor 115. The rectangular pulse is produced at the collector of the transistor 116 corresponding to the ignition pulse, i.e., the engine rpm is differentiated by the differentiation circuit comprising the capacitor 119 and the resistor 120. The thus differentiated positive pulse is applied to the base of the transistor 131. Then, if the transistor 131 is in its cutoff state the capacitor 132 is charged from the power source through the resistor 133 and this charging current flows to the base of the transistor 131, so that the current flowing through the resistor 133 is multiplied by the amplification factor of the transistor 131 and the capacity of the capacitor 132 may be effectively multiplied by the amplification factor of the transistor 131. On the other hand, after the capacitor 132 is charged, it discharges through the transistor 135 of a emitter follower configuration and the resistors 136 and 137, and so the input impedance of the transistor 135 as looked at by the collector of the transistor 131 consists of the resistance of the emitter follower resistors 136 and 137 multiplied by the amplification factor of the transistor 135 and the capacity of the capacitor 132. In case of this discharge it may be effectively multiplied by the amplification factor of the transistor 135.

The transistor 131 conducts when the differentiated positive pulse is applied to the base thereof, the charge stored in the capacitor 132 is discharged through the collector and the emitter of the transistor 131. Therefore, the collector potential of the transistor 131 changes depending on the number of pulses applied to its base per unit time and in such a manner that this collector potential decreases as the engine speed increases, and when the engine speed reaches a predetermined number of revolutions the base potential of the transistor 135 decreases thereby driving the transistor 135 into its cutoff state. The setting of the engine speed in this case may be selected as desired by changing the resistance value of the variable resistor 140.

Referring again to FIG. 2, numeral 150 designates a temperature detecting circuit, 151 a fourth transistor forming an AND circuit with the third transistor 138 in the revolution detecting circuit 110, 152 and 153 resistors, 154 a variable resistor which determines the base cutoff potential of the transistor 151, 155 a thermistor disposed at a suitable place within the compartment of the vehicle so that the temperature within the compartment may be detected by means of a change in the resistance value of the thermistor.

The operation of the temperature detecting circuit constructed as described above will now be explained. The temperature within the compartment is detected by the thermistor 155 by a change in its resistance, while the base potential of the transistor 151 varies in accordance with the ratio of the thermistor 155 to the resistor 153 and the variable resistor 154, and so the transistor 151 is cut off when the temperature within the compartment has risen to a predetermined value with the resultant decrease in the resistance value of the thermistor 155. The setting of the temperature within the compartment at which the transistor 151 will be cut off may be adjusted as desired by means of the variable resistor 154.

When the third transistor 138 in the revolution detecting circuit 110 is cut off, the fourth transistor 151 in the temperature detecting circuit 150 is also cut off, that is, when the engine speed gets higher than a predetermined value and the temperature within the compartment rises above a predetermined value so that both of the transistors 138 and 151 are cut off thereby obtaining the logical product. A voltage approximating the power source voltage is the produced through the resistor 159 at the collector of the transistors 138 and 151.

Referring back to FIG. 2, numeral 160 designates a switching circuit, 161 an input stage transistor, 162 and 163 output stage transistors, 164 a feedback capacitor, 165 and 166 transistors, 167, 168 and 169 resistors, 170 a capacitor, 171, 172, 173, 174 and 175 resistors, 180 a diode for absorbing the counter electromotive force in the electromagnetic coil 91 of the electromagnetic clutch 90.

With the construction described above, the operation of the switching circuit 160 will be explained. As both of the transistors 138 and 151 are cut off so that a voltage is produced at the common collector thereof, the transistor 161 conducts and hence the transistors 162 and 163 also conduct, so that the electromagnetic coil 91 of the electromagnetic clutch 90 is energized to connect the pulley 100 driven by the engine and the compressor 80 to bring the cooler into operation. In this situation, the level of the collector potential of the transistor 161 and those of the transistors 162 and 163 are low and the transistors 166 and 165 are both in their cutoff state. Under these circumstances, if the electromagnetic coil 91 which is the load is short-circuited, the collector potential of the transistor 163 increases so that the transistor 165 is turned on and the transistors 162 and 163 are cut off to thereby prevent the breakdown of the transistor 163.

On the other hand, in order to eliminate any instability and stabilize the conduction and non-conduction operations of the transistors, particularly the third transistor 138 in the final stage of the revolution detecting circuit 110, which take place in response to variations in the engine rpm, a parallel feed-back is applied through the resistor 156 to the base of the third transistor 138 from the collector of the input stage transistor 161 in the switching circuit 160 to thereby provide the required hysteresis for the conduction and non-conduction operations of the transistor 138.

Figure 3:
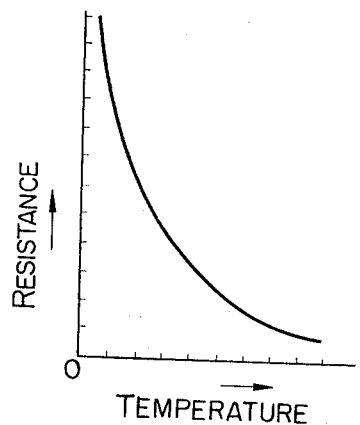
FIG. 3 is a diagram showing the temperature characteristics of a thermistor.

Similarly, since the temperature characteristics of the thermistor 155 in the temperature detecting circuit 150 are such that its resistance value (ordinate) changes non-linearly with temperature changes (abscissa) as shown in FIG. 3, in order to stabilize the conduction and non-conduction hysteresis of the fourth transistor 151 with temperature changes the resistor 157 is brought from the collector of the input stage transistor 161 in the switching circuit 160 to the negative side of the variable resistor 154, i.e., the input side of the input stage transistor 161 so as to make the aforesaid hysteresis substantially constant in terms of temperature. Furthermore, in order to ensure further improvement in the stabilization of the characteristics by such parallel feedbacks, a reference diode 192 is provided to maintain the power source voltage of the revolution detecting circuit 110 and the temperature detecting circuit 150 at a predetermined value. The purpose of a diode 200 is to absorb the surge voltages induced in the primary winding 71 of the ignition coil 70.

The system of the present invention operates such that when the braker points 73 associated with the secondary of the ignition coil 71 are operated, a signal is produced which may provide an indication of the engine speed. This signal at the output of the ignition coil 71 is communicated to a voltage divider network including resistors 111 and 112. This signal is then smoothed out by resistor capacitor combination 113, 115 which signal in turn drives transistor 116 to a conductant state in accordance with each input pulse. The output signal of transistor 116 is differentiated by the capacitor resistor combination 119, 120 which provides an input to transistor 131 having a capacitor 132 coupling its collector to its base. Each time a pulse is transmitted to the base of transistor 131, a capacitor 132 charged gradually through resistor 133 as current flows through the conducting transistor 131. As the input pulses to the transistor 131 increase in frequency, the transistor 131 conducts at a faster rate, therefore capacitor 132 becomes less fully charged.

Capacitor 132 is charged from the power supply 110 through resistor 133 each time the transistor 131 is in its non-conductant state. Therefore, as the period or interval time between each successive pulse decreases the amount of charge which the capacitor 132 accumulates decreases. This decrease in potential stored on capacitor 132 will eventually reach the point where it is not sufficient to maintain the base current for transistor 135 and, therefore, the transistor 135 will be rendered non-conductive. The use of the transistor 135 and its associated resistors 136 and 137 in an emitter follower configuration provides a high input impedance between the output of transistor 131 and the input to transistor 138. The variable resistor circuit 140 is used in the emitter circuit of transistor 135 to adjust the potential at which transistor 135 will cut off, thus effectively setting the upper limit of engine speed at which transistor 135 will remain conducting. When transistor 135 becomes cut off, the potential of its emitter circuit is driven positive and transistor 138 becomes conductive thereby satisfying one of the conditions, namely a selected minimum engine speed for energizing the winding 91 of the magnetic clutch which couples a compressor of the cooling system to the mechanical pulley 100 shown in FIG. 1.

A second condition necessary for engaging the winding 91 is established such that the compartment temperature must increase to a selected temperature. A transistor 151 is provided with an input from a thermistor 155 and a variable resistor 154. As the temperature increases, the resistance of the thermistor 155 decreases thereby driving the base of transistor 151 negative until it cuts off. By setting the value of resistor 164 to a selected value, the amount by which the resistance of thermistor 155 must decrease to cut off transistor 151 is determined.

When both transistors 131 and 151 are cut off their common collector terminal, which is coupled to the base of transistor 151, is driven positive thereby causing the transistor 151 to become conductive. Current flowing in the collector-emitter circuit of transistor 151 is coupled to the base circuit of transistor 162, which in turn causes it to conduct and drive transistor 153 to a conductive state, thereby causing energy to flow from the power source 10, closed switches 20 and 30, through the coil 191 of the magnetic clutch to the collector-emitter circuit of transistor 163 to common.

In accordance with this discussion it can be seen that the system described herein provides an efficient, sensitive, and effective means for controlling the activation of an automobile cooling system in accordance with engine speed variables and temperature conditions.

It is to be noted that the cooler starting means operated by the output signal from the switching circuit 160 is not limited to the electromagnetic clutch 90, but any other starting means may be equally employed. Furthermore, the thermistor 155 in the temperature detecting circuit may be substituted by any other heat sensitive elements such as a "pogistor", positive characteristic thermistor and "crytegistor".

While there has been described what is at present considered to be the preferred embodiment of the invention, it will be obvious to those skilled in the art that various changes and modifications may be made therein, without departing from the invention, and it is therefore the aim of the appended claims to cover all such changes and modifications as fall within the true spirit and scope of the invention.

We claim:

1. A control system for a cooler of a vehicle compartment, said cooler being driven by an internal combustion engine of the vehicle and through a magnetic clutch, and said cooler includes a dectector for providing an indication of compartment temperature, wherein the improvement comprises:
   a revolution detecting means comprising: a first electrical circuit coupled with an ignition coil for the vehicle for producing electrical pulses corresponding to the output of the said ignition coil, said output pulses being indicative of the number of revolutions of the engine;
   a first transistor having a base coupled to said first electrical circuit, being rendered conductive in response to the ignition pulses, and
   a capacitor coupled between the base and collector of the first transistor, said capacitor being gradually charged for each interval of said ignition pulses and discharged through the collector-emitter circuit of the transistor when conductive, thereby changing the collector voltage of the first transistor in accordance with the variation in the number of ignition pulses;
   a second electrical circuit including the detector for producing an output when the compartment temperature exceeds a selected value;
   circuit means having inputs responsive to the outputs of the revolution detection means and the second electrical circuit for producing an output control voltage, when the respective inputs achieve values indicative of an engine speed greater than a selected number of revolutions and a compartment temperature greater than a selected temperature; and
   switching circuit means operative when energized by said circuit means for energizing said magnetic clutch, thereby mechanically coupling the cooler to the engine.

2. The control system according to claim 1, wherein said first electrical circuit comprises:
   a voltage dividing circuit connected in circuit with said ignition coil for producing output pulses corresponding to said ignition pulses,
   a smoothing circuit including a resistor and capacitor network connected in circuit with said voltage dividing circuit, for producing smoother pulses from said output pulses of said voltage divider circuit,
   a second transistor connected in circuit with said smoothing circuit for producing square wave output pulses in response thereto, and
   a differentiating circuit responsively coupled with said second transistor for converting said square wave output to a positive polarity.

3. Control circuit according to claim 2, including, an operating coil of said magnetic clutch, responsive when energized, to activate said clutch and wherein said switching circuit means comprises:

an input transistor connected in circuit with said circuit means for producing an output signal responsive to said control output voltage, an output transistor having its base responsively coupled with said input transistor, and its collector-emitter circuit connected in series with said operating coil of said magnetic clutch for controlling the energization of said coil in accordance with output signals of said input transistor, and a protection circuit for detecting the collector voltage of said output transistor and for connecting said collector to ground potential when said collector voltage exceeds a predetermined value.

4. A control system according to claim 1, wherein said circuit means comprises an AND circuit including:

a third transistor responsively coupled with said second electrical circuit, and rendered non-conductive when said collector output voltage decreases below a selected value, and a fourth transistor responsively coupled to the output of the detection circuit means, rendered non-conductive, when said output indicates a temperature greater than a selected value, the output of said AND circuit being effective to activate said magnetic clutch when both the third and fourth transistors are in a non-conductive state.

5. Control system according to claim 4, further comprising: feedback means for providing a positive feedback from said switching circuit to said third transistor in parallel with said collector output voltage, and for providing another positive feedback from said switching circuit to said fourth transistor in parallel with said detector output voltage, for stabilizing the conductive and non-conductive operation of said respective transistors.

6. Control system according to claim 1, wherein the circuit elements are chosen to have parameter values chosen to facilitate fabrication by the utilization of integrated circuits.

* * * * *